United States Patent
Wagner et al.

(10) Patent No.: US 7,657,775 B1
(45) Date of Patent: Feb. 2, 2010

(54) DYNAMIC MEMORY CLOCK ADJUSTMENTS

(75) Inventors: Barry Wagner, San Jose, CA (US); Jonah M. Alben, San Jose, CA (US); Sonny Yeoh, San Jose, CA (US); Jeffrey J. Irwin, Sunnyvale, CA (US); Saurabh Gupta, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

(21) Appl. No.: 11/944,429

(22) Filed: Nov. 22, 2007

Related U.S. Application Data (63) Continuation of application No. 10/742,444, filed on Dec. 18, 2003, now Pat. No. 7,315,957.

(51) Int. Cl.
*G06F 1/00* (2006.01)
*H03L 7/00* (2006.01)
*H03B 5/12* (2006.01)

(52) U.S. Cl. .................. 713/501; 327/144; 331/49
(58) Field of Classification Search .................. 713/501
See application file for complete search history.

(56) References Cited

U.S. PATENT DOCUMENTS

| | | | |
|---|---|---|---|
| 4,203,107 A | 5/1980 | Lovercheck | |
| 4,542,376 A | 9/1985 | Bass et al. | |
| 5,142,366 A | 8/1992 | Brown et al. | |
| 5,157,696 A * | 10/1992 | Hara | 375/347 |
| 5,349,682 A | 9/1994 | Rosenberry | |
| 5,541,646 A | 7/1996 | Huang | |
| 5,566,325 A | 10/1996 | Bruce et al. | |
| 5,615,376 A | 3/1997 | Ranganathan | |
| 5,619,707 A | 4/1997 | Suboh | |
| 5,678,065 A | 10/1997 | Lee et al. | |
| 6,049,870 A | 4/2000 | Greaves et al. | |
| 6,104,222 A | 8/2000 | Embree | |
| 6,114,987 A | 9/2000 | Bjornholt | |
| 6,127,896 A | 10/2000 | Burzio | |
| 6,185,693 B1 | 2/2001 | Garmire et al. | |
| 6,341,355 B1 | 1/2002 | Rutherford et al. | |
| 6,414,555 B2 | 7/2002 | Staszewski et al. | |
| 6,463,013 B1 | 10/2002 | Liu et al. | |
| 6,476,800 B2 | 11/2002 | Millman et al. | |
| 6,515,519 B1 * | 2/2003 | Miyazaki et al. | 327/105 |
| 6,529,083 B2 | 3/2003 | Fujita | |
| 6,678,834 B1 | 1/2004 | Aihara et al. | |
| 6,750,687 B1 | 6/2004 | Klecka, III | |
| 6,870,531 B2 | 3/2005 | Lee et al. | |

(Continued)

*Primary Examiner*—Suresh K Suryawanshi
(74) *Attorney, Agent, or Firm*—Townsend and Townsend and Crew LLP; J. Matthew Zigmant (57) ABSTRACT

Methods, circuits, and apparatus for changing a frequency of a clock signal provided to a graphics memory while reducing any resulting visual glitch or disturbance on a monitor. A specific embodiment provides multiple clock sources that may be multiplexed or selected to provide a memory clock signal to the graphics memory. The multiplexer switches from providing a first clock source signal as the memory clock signal to providing a second clock source signal as the memory clock signal. The first clock source changes its frequency of operation. After the first clock source settles or stabilizes, the multiplexer switches back to providing the first clock source signal as the memory clock signal.

20 Claims, 7 Drawing Sheets

U.S. PATENT DOCUMENTS

| | | |
|---|---|---|
| 7,184,708 B1 | 2/2007 | Kwa et al. |
| 7,187,220 B1 | 3/2007 | Alben et al. |
| 7,315,957 B1 | 1/2008 | Wagner et al. |
| 2004/0005885 A1 | 1/2004 | Kato et al. |
| 2005/0053179 A1 | 3/2005 | Knapp et al. |
| 2005/0278463 A1 | 12/2005 | Ando |
| 2007/0208964 A1 | 9/2007 | Sandon et al. |
| 2008/0049009 A1 | 2/2008 | Khodorkovsky |

* cited by examiner

DYNAMIC MEMORY CLOCK ADJUSTMENTS

CROSS-REFERENCES TO RELATED APPLICATIONS

This application is a continuation of U.S. patent application Ser. No. 10/742,444, filed Dec. 18, 2003 now U.S. Pat. No. 7,315,957 titled DYNAMIC MEMORY CLOCK ADJUSTMENTS, by Wagner et al. and is related to commonly-assigned U.S. patent application Ser. Nos. 10/449,943, titled A PROCESSOR PERFORMANCE ADJUSTMENT SYSTEM AND METHOD, by Kelleher et al., and 10/741,149 (now U.S. Pat. No. 7,187,220), titled MEMORY CLOCK SLOWDOWN, by Alben et al, all of which are incorporated by reference.

BACKGROUND

The present invention relates generally to graphics processors, and more particularly to dynamic memory clock adjustments made by a graphics processor.

Graphics processors access and process huge volumes of data while generating video images for display on a monitor. Much of this data is stored and retrieved from a memory, such as a dynamic random-access memory (DRAM). Often these DRAMs are manufactured using a highly specialized process, and are therefore manufactured on an integrated circuit separate from the graphics processor itself. A graphics processor may store and retrieve data from one or more of these DRAMs. In order to facilitate the timing of data transfers between the graphics processor and memory, the graphics processor provides a clock signal, referred to as a memory clock (MCLK) to the memory circuits.

There are several conditions under which it is desirable for a graphics processor to change the frequency of a memory clock signal. For example, during startup and when power can be saved (or can no longer be saved), it is desirable to increase or decrease the frequency of the memory clock signal.

During startup, a splash screen is typically displayed identifying the operating system or other aspect of the computer system. This image is often at lower resolution, for example it may be compatible with the VGA standard. Once driver software is loaded into the computer system, images are displayed at a higher resolution. This change in resolution is facilitated in part by a change in the frequency of the memory clock signal. Also, if the screen image is not changing, for example when the text of a patent is being read by the user, the graphics processor may be able to run at a lower clock speed. This reduction in speed results in power savings that reduces battery drain in mobile applications and increases the mean time-before-failure of the graphics processor circuit.

When these changes in memory clock signal frequency occur, it is very desirable to not glitch or otherwise create a visual disturbance on the video monitor. Accordingly, what is needed are methods, circuits, and apparatus for changing a memory clock signal frequency without causing these disturbances.

SUMMARY

Accordingly, embodiments of the present invention provide methods, circuits, and apparatus for changing a frequency of a memory clock signal provided to a graphics memory without causing a visual glitch or disturbance on a monitor. A specific embodiment provides multiple clock sources that may be multiplexed or selected to provide the memory clock signal to the graphics memory. The multiplexer switches from providing a first clock source as the memory clock signal to providing a second clock source as the memory clock signal. The first clock source changes its frequency of operation. After the first clock source settles or stabilizes, the multiplexer switches back to providing the first clock source as the memory clock signal.

An exemplary embodiment of the present invention provides a method of changing a frequency of a clock signal provided to a memory. This method includes generating a first clock signal having a first clock frequency by using a first clock source, and generating a second clock signal having a second clock frequency by using a second clock source. The first clock signal is selectively provided to the memory. After some time, the second clock signal is selectively provided to the memory. The frequency of the first clock signal is change to a third clock frequency. The first clock signal is then selectively provided to the memory.

Another exemplary embodiment of the present invention provides a method of changing a frequency of a clock signal by using a sequencer in a graphics processor. This method includes generating a first clock signal by using a first clock source, the first clock signal having a first frequency, and generating a first clock signal using a second clock source, the second clock signal having a second frequency. The method further provides selectively providing the first clock signal having the first frequency as a memory clock signal, determining the presence of a screen retrace or blanking period, requesting that a frame buffer interface cease activity, selectively providing the second clock signal having the second frequency as the memory clock signal, and changing the first frequency of the first clock signal to a third frequency. Again, the presence of a retrace is determined and a request is made to the frame buffer to cease activity. The first clock signal having the third frequency is then provided as the memory clock signal.

A further exemplary embodiment provides a method of changing a frequency of a clock signal provided to a memory. This method includes providing a first clock signal having a first frequency, the first clock signal selectively provided as a clock signal to the memory, the first clock signal generated by a first clock source, providing a second clock signal having a second frequency, the second clock signal generated by a second clock source, and providing a pixel clock signal having a third frequency. The method further provides determining whether a vertical retrace signal is active, changing the pixel clock signal such that the pixel clock has a fourth frequency, the fourth frequency being lower than the third frequency, selectively providing the second clock signal as the clock signal to the memory, and changing the pixel clock signal such that the pixel clock has the third frequency.

A better understanding of the nature and advantages of the present invention may be gained with reference to the following detailed description and the accompanying drawings.

DESCRIPTION OF EXEMPLARY EMBODIMENTS

Figure 1:
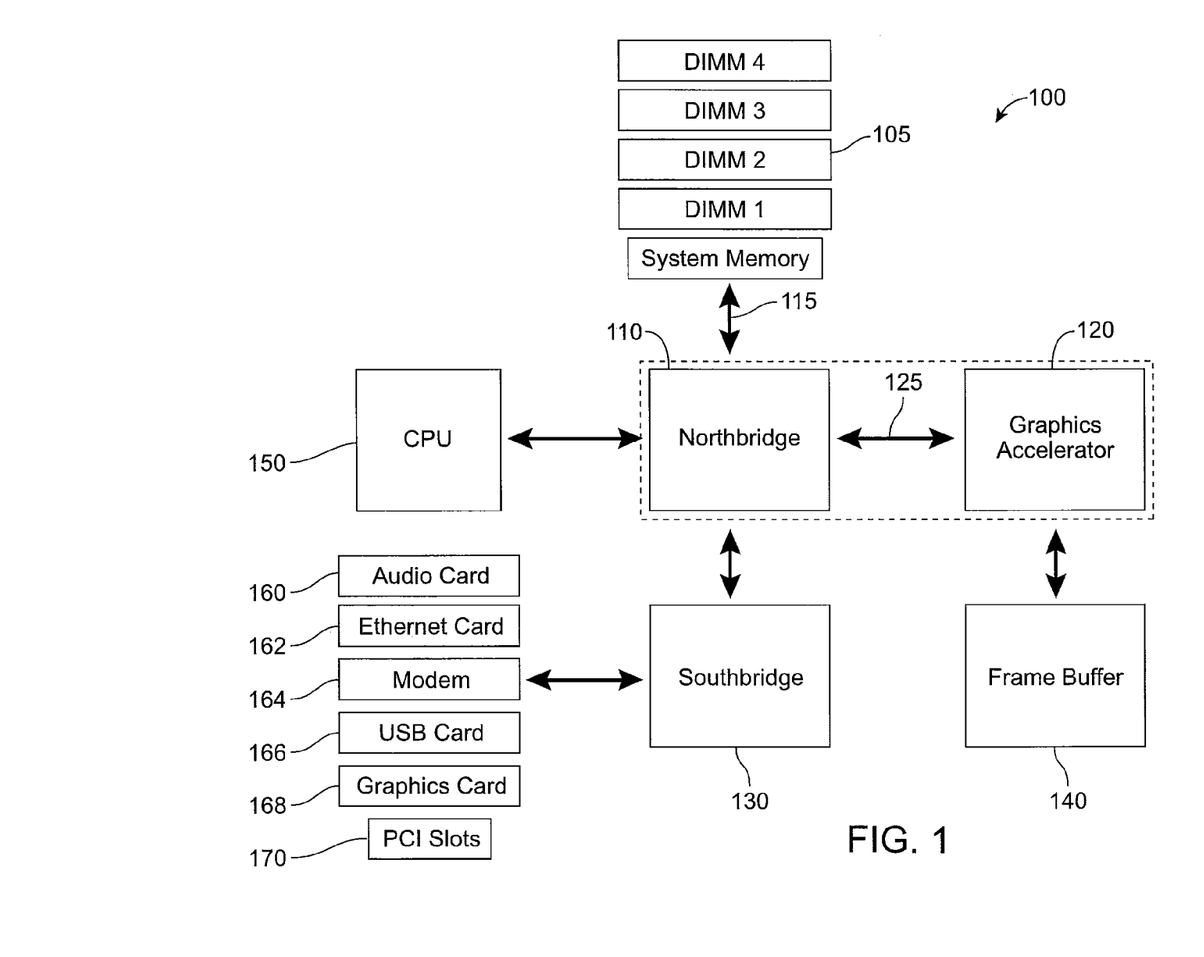
FIG. 1 is a block diagram of a computing system that benefits by incorporation of embodiments of the present invention.

FIG. 1 is a block diagram of a computing system 100 that benefits by incorporation of embodiments of the present invention. Included are a Northbridge 110, graphics accelerator 120, Southbridge 130, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memories 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer which stores the pixels to be displayed.

In this architecture, CPU 150 performs the bulk of the processing tasks required by this computing system. In particular, the graphics accelerator 120 relies on the CPU 150 to set up calculations and compute geometry values. Also, the audio or sound card 160 relies on the CPU 150 to process audio data, positional computations, and various effects, such as chorus, reverb, obstruction, occlusion, and the like, all simultaneously. Moreover, the CPU 150 remains responsible for other instructions related to applications that may be running, as well as for the control of the various peripheral devices connected to the Southbridge 130.

Figure 2:
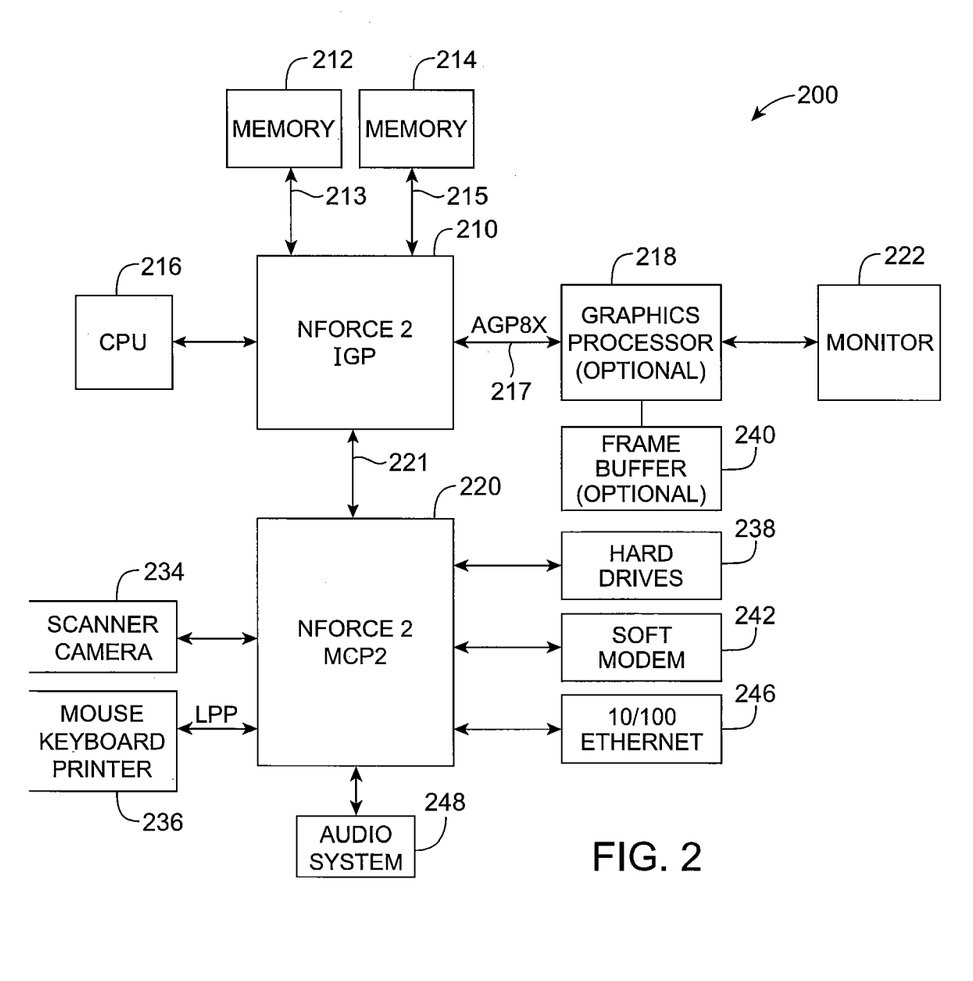
FIG. 2 is a block diagram of an improved computer system that benefits by incorporation of embodiments of the present invention.

FIG. 2 is a block diagram of an improved computer system that benefits by incorporation of embodiments of the present invention. Included are an NVIDIA nForce™ 2 integrated graphics processor (IGP) 210, an nForce2 media communications processor (MCP2) 220, memory 212 and 214, CPU 216, optional graphics processor 218 and frame buffer 240, monitor 222, scanner or camera 234, mouse, keyboard, and printer 236, hard drives 238, soft modem 242, Ethernet network or LAN 246, and audio system 248.

This revolutionary system architecture has been designed around a distributed processing platform, which frees up the CPU to perform tasks best suited to it. Specifically, the nForce2 IGP 210 includes a graphics processing unit (GPU) (not shown) which is able to perform graphics computations previously left to the CPU 216. Alternately, the nForce2 IGP 210 may interface to an optional GPU 218 which performs these computations. Also, nForce2 MCP2 220 includes an audio processing unit (APU), which is capable of performing many of the audio computations previously done by the CPU 216. In this way, the CPU is free to perform its tasks more efficiently. Also, by incorporating a suite of networking and communications technologies such as USB and Ethernet, the nForce2 MCP2 220 is able to perform much of the communication tasks that were previously the responsibility of the CPU 216.

In this architecture, the nForce2 IGP 210 communicates with memories 212 and 214 of over buses 213 and 215. The nForce2 IGP 210 also interfaces to an optional graphics processor 218 over an advanced AGP bus 217. In various computer systems, optional processor 218 may be removed, and the monitor 222 may be driven by the nForce2 IGP directly. In other systems, there may be more than one monitor 222, some or all of which are coupled to optional graphics processor 218 or the nForce2 IGP 210 directly. The nForce2 IGP 210 communicates with the nForce2 MCP2 220 over a HyperTransport™ link 221. The optional graphics processor 218, may also interface with external memory, which is not shown in this example. Embodiments of the present invention may be used to improve changes in the frequency of the clock signals at the interfaces to memories 212 and 214, from the optional graphics processor 218 to its external memory (not shown), or to other optional memories not shown here, or other memory interfaces or other circuits in other digital systems.

The nForce2 MCP2 220 contains controllers for Ethernet connections 246 and soft modem 242. Also included are an interface for a mouse, keyboard, and printer 236, and USB ports for cameras and scanners 234 and hard drives 238.

This arrangement allows the CPU 216, the nForce2 IGP 210, and the nForce2 MCP2 220, to perform processing independently, concurrently, and in a parallel fashion.

Again, at startup, the frequency of operation of the graphics processor in the nForce2 IGP 210 or the optional graphics processor 218 may be at a low first or initial frequency. For example, this frequency may be compatible with the VGA specification. After a driver is loaded, the frequency of operation of the graphics processor typically increases. During this transition, it is desirable that any images being displayed on the monitor 222 not exhibiting annoying glitches or disturbances caused by the changing memory clock frequency. For example, when the memory clock frequency changes, it is often necessary to temporarily halt access to the memories 212 in order to ensure that data read from the memories 212 is not corrupted by the frequency change. This halt in reading data from the memories 212 may cause a glitch or other visual disturbance on monitor 222 if the display controllers or heads are starved for memory bandwidth.

Also, it is desirable to save or reduce the power consumption of the graphics processor in the nForce2 IGP 210 or optional graphics processor 218. In particular, when the activity level in the graphics processor is low or below a predetermined or programmable threshold, for example, when are no screen refreshes taking place on monitor 222, it is desirable to reduce the frequency of clock signals used or provided by the graphics processor in the nForce2 IGP 210 or optional graphics processor 218. For example, it is desirable to reduce a memory clock signal (not shown) provided by the nForce IGP 210 to the memories 212 and 214. When a screen refresh, window movement, change in display dimensions, or other such activity takes place, the clock frequency is increased.

One method of changing the frequency of a memory clock signal is to transition from its initial frequency to a final frequency in small steps. This approach works well where the delay-locked loop (DLL) (not shown) in the external DRAM is analog. These analog DLLs tend to not lose track of the in-coming clock signal when the clock signal is changed in small steps. DRAMs having analog DLLs are manufactured, for example, by Samsung. Unfortunately, this approach is not universally useful, as it does not work in digital DLLs. Specifically, a digital DLL in a DRAM memory tends to lose lock if the DLL is varied in frequency in this way.

Accordingly, an embodiment of the present invention provides a first phase-locked loop (PLL) clock generator generating a first clock signal having a first frequency, and a second phase locked loop generating a second clock signal having a second frequency. A memory clock signal is multiplexed from the first clock signal to the second clock signal. The first PLL frequency is changed to a third frequency. After the first PLL settles, the memory clock signal is multiplexed back to the first clock signal, which now has the third frequency. (Alternately, the updated first clock signal may be referred to as a third clock signal.) Following each change in memory clock signal frequency, the DLL in the external DRAM may be reset. In this way, the memory clock signal frequency is changed from the first frequency to the third frequency.

Figure 3:
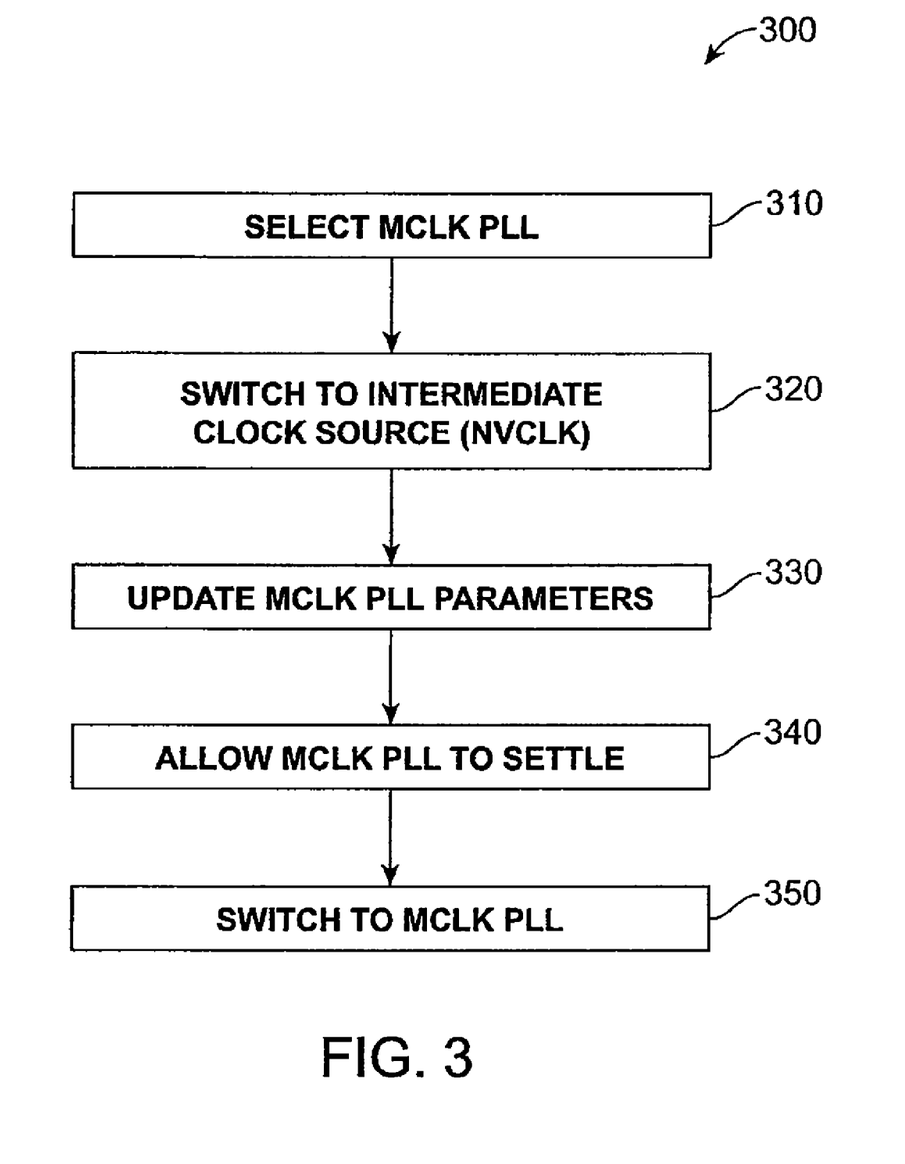
FIG. 3 is a flowchart of a method of changing the frequency of a memory clock signal consistent with an embodiment of the present invention.

FIG. 3 is a flowchart 300 of a method of changing the frequency of a memory clock signal consistent with an embodiment of the present invention. This figure, and the other included figures are shown for illustrative purposes only and do not limit either the possible embodiments of the present invention or the claims.

In act 310, a memory clock PLL is selected to provide a memory clock signal to an external memory. In act 320, an intermediate clock source is selected to provide the memory clock signal to an external memory. In a specific embodiment of the present invention, this clock source provides a clock to the core logic of the graphics processor, and is referred to as NVCLK. In act 330, the memory clock PLL is updated such that it operates at a new frequency. The memory clock PLL is allowed to settle to this new frequency in act 340. In act 350, the memory clock PLL, which is now operating at the new frequency, is re-selected to provide the memory clock signal to the external memory.

Figure 4:
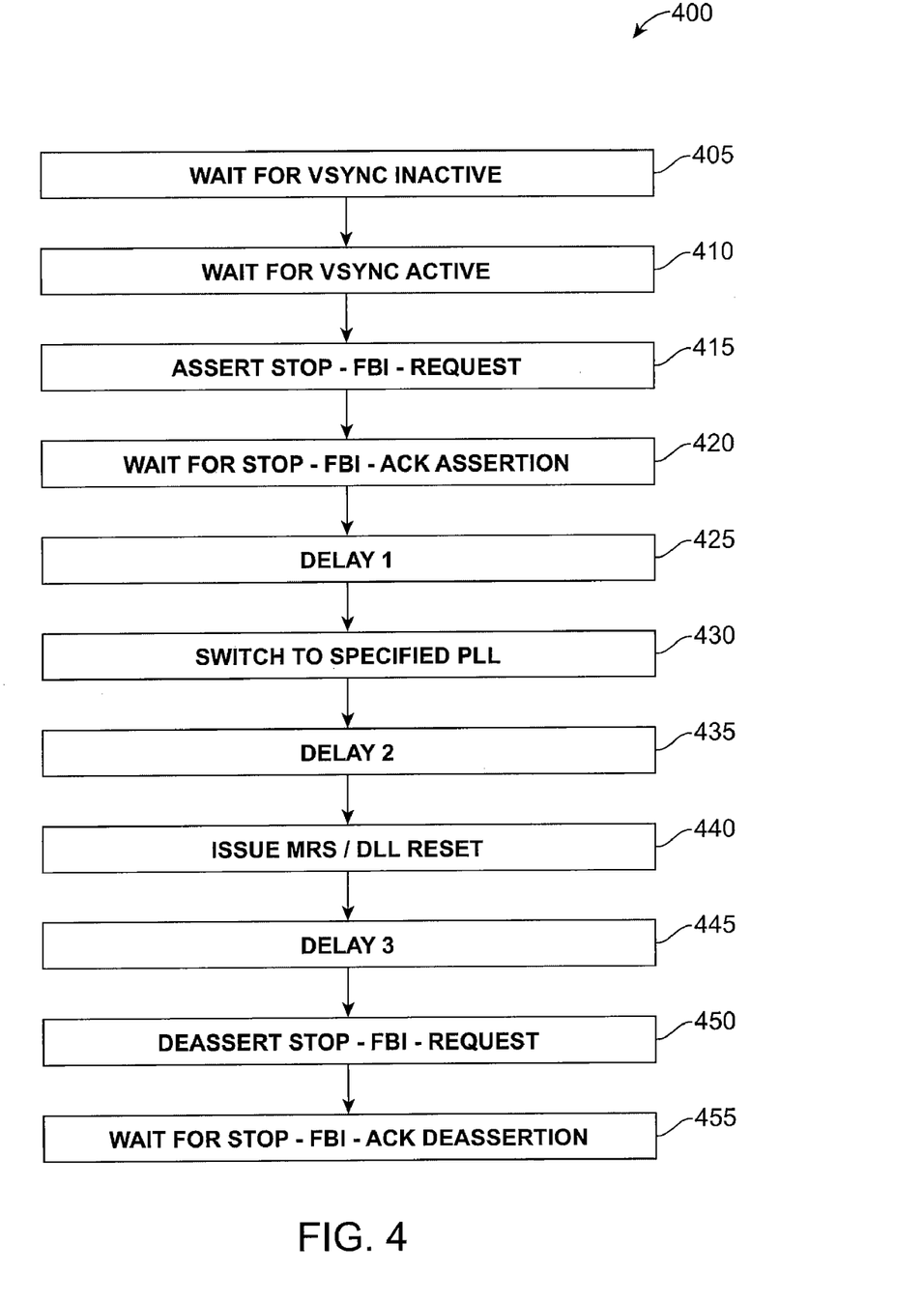
FIG. 4 is a flowchart illustrating a method of changing frequencies of a clock consistent with an embodiment of the present invention.

FIG. 4 is a flowchart illustrating a method of changing a frequency of a memory clock signal consistent with an embodiment of the present invention. Typically, a completed clock frequency changeover involves two passes through this flowchart. During the first pass, the memory clock signal is switched from a first clock source to a second clock source, while during the second pass through this flowchart, the memory clock signal switches from the second clock source back to the first clock source. Between the two passes, the frequency of operation of the first clock source is changed from an initial to a final memory clock signal frequency.

In act 405, a sequencer or other circuit waits for a VSYNC signal to be inactive. That is, it is determined that the monitor or display is in an active video region. In act 410, the sequencer waits for VSYNC to become active once again. That is, it is determined that a vertical blanking period has started. In this way, the sequencer can determine the start of a vertical blanking period.

In act 415, the sequencer asserts a stop-frame-buffer-interface request, that is a request signal that the frame buffer interface (FBI) (which also may be referred to as a "memory controller" or "DRAM controller") stop writing to and reading data from the frame buffer or graphics memory. In act 420, the sequencer waits for an acknowledgment from the frame buffer that it has ceased activity. Alternately, a period of time may be allowed to pass, the period of time such that it may be presumed that any frame buffer activity has stopped. Alternately, no such request to the frame buffer interface is made, rather software instructions are used to prevent various graphics pipeline engines from accessing the memory. In act 425, an optional delay is allowed to transpire.

In act 430, a new clock source or phase-locked loop is selected as the source of the memory clock signal. During the first pass through this flow, a memory clock PLL is typically replaced by an intermediate PLL. During the second pass, the intermediate PLL is replaced by the memory clock PLL, which now has a new frequency. In a specific embodiment of the present invention, the intermediate PLL provides a clock signal to the core of the graphics processor.

In act 435, a second delay is allowed to transpire such that the system settles, while in act 440, the DLL in the memory is reset. In act 445, a third delay is allowed to transpire during which the DLL locks onto the new memory clock signal. In act 450 the stop-FBI-request signal is de-asserted, and in act 455, the sequencer waits for an acknowledgment from the frame buffer interface. Alternately, the sequencer may wait a predetermined amount of time, during which it may be presumed that the frame buffer interface activity is restarted.

Figure 5:
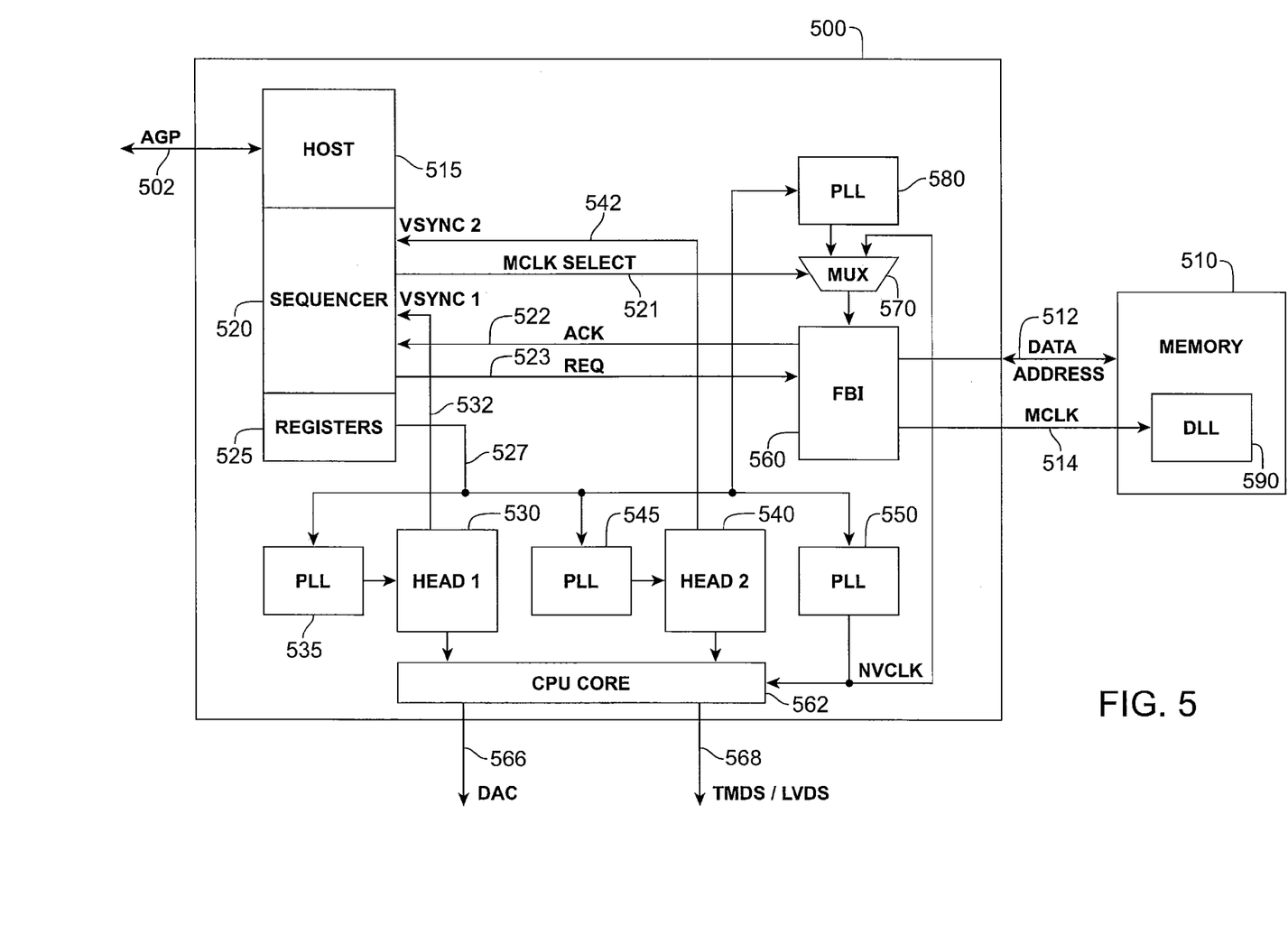
FIG. 5 is a block diagram of a graphics processor and memory that is consistent with an embodiment of the present invention.

FIG. 5 is a block diagram of a graphics processor 500 and memory 510 that is consistent with an embodiment of the present invention. In a specific embodiment of the present invention, the graphics processor 500 is formed on one integrated circuit, while the memory 510 is formed on another. The graphics processor 500 receives data and information on the AGP bus 502, typically from a Northbridge 110 or nForce2 IGP 210, and provides video outputs using a digital-to-analog (DAC) output 566 and television monitor display system/low voltage differential signaling (TMDS/LVDS) output 568. The graphics processor 500 writes data to and reads data from the memory 510 using the address and data buses 512. The graphics processor 500 clocks the memory 510 using the memory clock signal MCLK on line 514.

The frequency of the memory clock signal MCLK provided on line 514 by the graphics processor 500 to the memory 510 determines the rate at which data may be transferred over bus 512. During different states of operation, different amounts of data may be transferred. For example, at boot-up, the data resolution of the monitor may be compliant with the VGA standard, while after boot-up, a higher data resolution and hence data transfer rate may be required. During the transition from low to high data transfer rate, it is desirable to increase the frequency of the memory clock signal MCLK on line 514 without creating a visible glitch or other disturbance on any images being display on monitor 222. Such a glitch may be caused if access to the memory 510 is halted due to a change in the frequency of the memory clock signal MCLK on line 514, and the display controllers or heads 530 and 540 are starved for memory bandwidth. Further, when a lower data transfer rate required, it is advantageous to lower the frequency of the memory clock signal MCLK on line 514.

Included in the graphics processor 500 are a host circuit 515, frame buffer interface 560, first and second display controllers or heads 530 and 540, graphics processing unit (GPU) core 562, PLLs 535, 545, 550, and 580, and multiplexer 570. The host 515 further includes a sequencer 520, which in turn includes a number of registers 525. The memory 510 further includes a delay-locked loop 590.

The host 515 receives information over the AGP bus 502. The host 515 includes a sequencer 520, which may also be referred to as a microcontroller or event sequencer. The sequencer 520 may be a hardware-based event sequencer, it may be software-based, or it may utilize aspects of both hardware and software.

The sequencer 520 includes a number of registers 525, which in turn controls settings for PLLs 535, 545, 550, and 580. One sequencer consistent with a specific embodiment of the present invention provides three parameters, M, N, and P to each PLL, where the frequency of operation is determined by the equation:

$$Fout = Fin[(N/M)/2^{\wedge\wedge}P],$$

wherein Fin is the frequency of a reference clock, for example a crystal oscillator, and ^^ is a symbol meaning "to the power of."

The sequencer 520 further controls multiplexer 570, which selectively provides a memory clock signal MCLK on line 514 from either PLL 580 or PLL 550 to the frame buffer interface 560. This memory clock signal MCLK on line 514 is in turn provided to the memory 510. In a specific embodiment of the present invention, PLL 580 typically provides the memory clock signal MCLK on line 514 to the frame buffer interface, while PLL 550 provides a clock signal to the GPU core 562.

A sequencer 520 used by a specific embodiment of the present invention examines the VSYNC signals on line 532 and 542 from the first and second heads 530 and 540. When an appropriate time is determined, the sequencer 520 begins the changeover and in the frequency of the memory clock signal MCLK on line 514. An appropriate time for the changeover to occur may be determined in a number of ways. For example, if only head 530 is active, the VSYNC signal 542 from head 540 may be ignored, and when the active VSYNC signal 532 indicates the beginning of a retrace period, the sequencer 520 may begin the change in clock frequency. Alternately, if both heads 530 and 540 are active, the sequencer 520 may begin the changeover at an appropriate time where the VSYNC signals 532 and 5542 overlap for a sufficiently long duration.

The sequencer 520 makes a request on line 523 to the frame buffer interface 560. This request instructs the frame buffer interface 560 to prevent data accesses over bus 512. The frame buffer interface 560 acknowledges this request to the sequencer 520 using line 522. The sequencer 520 then selects a new clock source by asserting or de-asserting the MCLK select line 521. Once the changeover is complete, the sequencer 520 withdraws the request on line 523, and the frame buffer interface 560 acknowledges this on line 522.

A sequence of events used by a specific embodiment of the present invention is as follows. Initially, the sequencer 520 selects the clock signal provided by PLL 580 as the source for the memory clock signal MCLK on line 514. The sequencer 520 observes activity on the VSYNC lines 532 and 542. At the appropriate time, for instance the beginning of a vertical retrace period, a request is made on line 523 to the frame buffer interface 560, instructing the frame buffer interface to cease data transfers on bus 512. The frame buffer interface 560 acknowledges this request over line 522. The sequencer 520 then changes the state of the MCLK select line 521, such that multiplexer 570 selects PLL 550 as the source of the memory clock signal MCLK on line 514. Optionally at this time, the sequencer 520 resets the DLL 590 in memory 510. The sequencer 520 then de-asserts the request on line 523, thus allowing the frame buffer interface 560 to resume data transfers over bus 512. The frame buffer interface 560 acknowledges this over line 522.

At this time, the sequencer 520 may change values in one or more of the registers 525, such that PLL 580 changes its frequency of operation from an initial value to a final value. This change typically takes a while to complete. This time is known as the PLL settling time. However, since PLL 580 is not selected as the memory clock signal source, the memory 510 is insulated from transients in the clock frequency of PLL 580. Because of this, the glitching of monitor 522 that would otherwise result is avoided.

At another appropriate time, for instance a following (or the next) vertical retrace period, the sequencer 520 once again requests that the frame buffer interface 560 cease data transfers over bus 512. The frame buffer interface 560 acknowledges this using line 522. The sequencer 520, using the MCLK select line 521, switches multiplexer 570 such that the PLL 580 is the source for the memory clock signal MCLK on line 514. Again, at this time, the sequencer 520 may reset the DLL 590 in memory 510. The sequencer 520 then de-asserts the request on line 523, thus allowing the frame buffer interface 560 to resume data transfers over bus 512. The frame buffer interface 560 acknowledges this over line 522. In this way, the memory clock signal MCLK on line 514 transitions from an initial to a final frequency in two steps such that transients in the period of the memory clock signal MCLK on line 514 are avoided.

In this way, a sequencer 520 is capable of receiving a single atomic "GO" command, and then switching the clock sources (and thus their frequency), and reprogramming memory and internal registers 525. When implemented in hardware, the sequencer 520 may perform these acts without being vulnerable to interrupts that could otherwise delay a change in clock frequency.

It will be appreciated by one skilled in the art that other variations on these circuits and methods may be made consistent with embodiments of the present invention. For example, in some embodiments, when the memory clock signal frequency is reduced below a certain frequency, the DLL 590 in the memory is simply disabled. Moreover, as memory clock signal frequency is changed, the column address select (CAS) timing may need to be adjusted. This timing is specific to the particular DRAM and timing used. Further, some signaling may be changed from differential to single ended, thus further reducing power dissipation.

Figure 6:
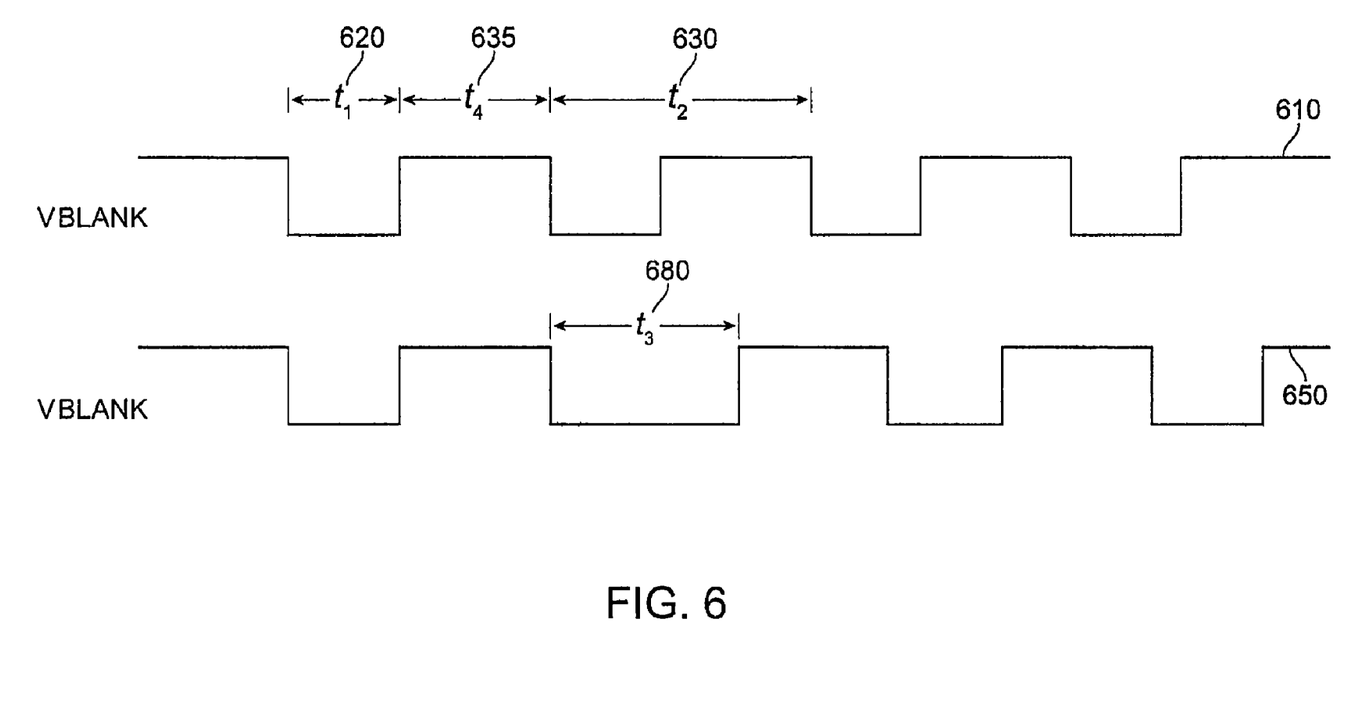
FIG. 6 illustrates a method of lengthening a vertical blank period that may be used by an embodiment of the present invention.

FIG. 6 illustrates a method of lengthening a vertical blank period that may be used by an embodiment of the present invention. Specifically, trace 610 illustrates a conventional vertical blanking waveform, where a vertical blank time is shown as $t_1$ 620, and a complete frame is shown as $t_2$ 630. In some monitors, the vertical blank time $t_1$ 620 is not sufficient to allow a memory clock signal changeover to occur. In particular, the vertical blanking times for flat-panel monitors is quite short.

The times $t_1$ 620 and $t_2$ 630 are determined by the length of a horizontal line. That is, the vertical blank time $t_1$ 620 and image refresh time $t_4$ 635 are multiples of the length of a horizontal line of the display. Accordingly, if the horizontal line length of the display is increased during a vertical blank time, the vertical blank time is increased. Trace 650 illustrates an example of a vertical blanking waveform were the horizontal line length is increased for one vertical blanking time $t_3$ 680. As can be seen, the vertical blank time $t_3$ 680 is lengthened in comparison to the vertical blank time $t_1$ 620. Accordingly, the vertical blank time $t_3$ 680 may be used to switch the memory clock signal from a first PLL source to a second PLL source. Once the vertical blank period $t_1$ 620 is complete, the length of the horizontal lines is returned to its correct value, and a screen refresh begins.

The vertical blank time for two frames may be lengthened, wherein during the first blanking time the memory clock signal may change from an initial to an intermediate frequency value, while during the second vertical blanking time the clock changes from an intermediate to a final value. These two frames may be consecutive frames or there may be intervening frames.

The practical effect of lengthening a vertical blank time is that the screen refresh rate for the monitor is reduced for one or more frames. However, the persistence of flat-panel displays is such that a reduced refresh rate for a couple of frames is not particularly noticeable.

Figure 7:
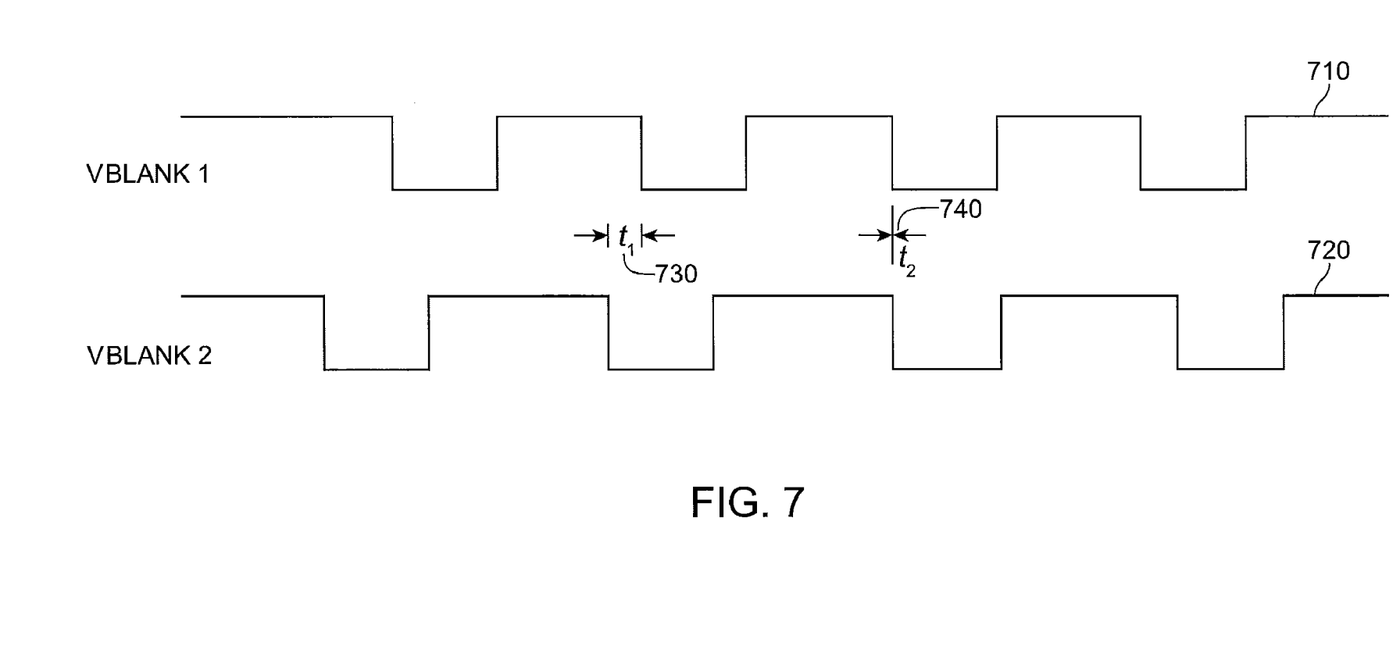
FIG. 7 illustrates a vertical blank timing that may occur when two or more display controllers or video heads having different refresh rates are active.

FIG. 7 illustrates a vertical blank timing that may occur when two or more video heads having different refresh rates are active. Specifically, the refresh rate for VBLANK1 710 is higher than that of VBLANK2 720. Accordingly, the vertical blank times for each heads to do not necessarily occur simultaneously. Any change in memory clock signal frequency should take place such that glitching on both monitors is avoided. Thus, a sequencer or other circuit consistent with an embodiment of the present invention may monitor the blanking waveforms from two or more heads and begin the memory clock signal changeover when the vertical retrace periods overlap for sufficient period of time.

For example, a sequencer may monitor the differences in start times 730 between vertical blank periods. If this time is below a predetermined value, it is known in that both video heads are blanking with sufficient overlap for the changeover to occur. Alternately, a sequencer or other circuit may monitor one of the VBLANK signals, determine when it enters its vertical blank period, then detect when the other head enters its vertical blank period. Again, if the difference in time is below a predetermined threshold, then it is known that the overlap is sufficient for the changeover to occur without glitching either monitor.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:
   a first phase-locked loop to generate a first clock signal, wherein the frequency of the first clock signal can be set to a first or second frequency;
   a second phase-locked loop to generate a second clock signal, wherein the frequency of the first clock signal is a third frequency;
   a selection circuit having a first input to receive the first clock signal and the second clock signal and to provide an output;
   a frame buffer interface to receive the output from the selection circuit and to provide a third clock signal to a memory device; and
   a first logic circuit to detect the start of a vertical blanking period.

2. The integrated circuit of claim 1, wherein after the first logic circuit detects a first vertical blanking period, the selection circuit selects the second clock signal and the frequency of the first clock signal is changed from the first frequency to the second frequency, and after the first logic circuit detects a second vertical blanking period, the selection circuit selects the first clock signal.

3. The integrated circuit of claim 1 further comprising a second logic circuit to detect when activity on the integrated circuit falls below a first threshold level.

4. The integrated circuit of claim 3, wherein when the second logic circuit detects that activity has fallen below the first threshold level, after the first logic circuit detects a first vertical blanking period, the selection circuit selects the second clock signal and the frequency of the first clock signal is changed from the first frequency to the second frequency, and after the first logic circuit detects a second vertical blanking period, the selection circuit selects the first clock signal.

5. The integrated circuit of claim 1, wherein the integrated circuit is a graphics processor.

6. The integrated circuit of claim 1, wherein the first logic circuit is a sequencer.

7. The integrated circuit of claim 1, wherein the selection circuit is a multiplexer.

8. A method of providing a clock signal to a memory, the method comprising:
   providing a first clock signal having a first frequency to the memory;
   detecting that activity on the integrated circuit is below a first threshold level; then
   detecting the start of a first vertical blanking period; then
   providing a second clock signal having a second frequency to the memory;
   changing the frequency of the first clock signal to a third frequency; and
   providing the first clock signal having the third frequency to the memory.

9. The method of claim 8 further comprising:
   after changing the frequency of the first clock signal to a third frequency, detecting the start of a second vertical blanking period, then providing the first clock signal having the third frequency to the memory.

10. The method of claim 9, wherein the third frequency is less than the first frequency.

11. A method of providing a clock signal to a memory, the method comprising:
    providing a first clock signal having a first frequency to the memory;
    detecting that activity on the integrated circuit is below a first threshold level; then
    detecting a difference in the start of a first vertical blanking period provided to a first monitor and the start of a second vertical blanking period provided to a second monitor, and if the difference is below a second threshold level; then
    providing a second clock signal having a second frequency to the memory;
    changing the frequency of the first clock signal to a third frequency; and
    providing the first clock signal having the third frequency to the memory.

12. The method of claim 8 further comprising:
    after detecting that activity on the integrated circuit is below a first threshold level, detecting a difference in the start of the first vertical blanking period provided to a first monitor and the start of a second vertical blanking period provided to a second monitor, and if the difference is below a second threshold level, then providing a second clock signal having a second frequency to the memory.

13. An integrated circuit comprising:
    a first phase-locked loop to generate a first clock signal, wherein the frequency of the first clock signal can be set to a first or second frequency;
    a second phase-locked loop to generate a second clock signal, wherein the frequency of the first clock signal is a third frequency;
    a selection circuit having a first input to receive the first clock signal and the second clock signal and to provide an output;

a frame buffer interface to receive the output from the selection circuit and to provide a third clock signal to a memory device; and a first logic circuit to generate a vertical synchronization signal having a vertical blanking period, wherein the duration of the vertical blanking period can be set to a first duration or a second duration.

14. The integrated circuit of claim 13 further comprising:
a second logic circuit to detect the beginning of a vertical blanking period.

15. The integrated circuit of claim 14, wherein after the second logic circuit detects a first vertical blanking period, the selection circuit selects the second clock signal, the frequency of the first clock signal is changed from the first frequency to the second frequency, and the duration of the vertical blanking period is changed from the first duration to the second duration.

16. The integrated circuit of claim 15, wherein after the second logic circuit detects a second vertical blanking period, the selection circuit selects the first clock signal, and the duration of the vertical blanking period is changed from the second duration to the first duration.

17. The integrated circuit of claim 14 further comprising a third logic circuit to detect when activity on the integrated circuit falls below a first threshold level.

18. The integrated circuit of claim 17, wherein when the third logic circuit detects that activity has fallen below the first threshold level, after the second logic circuit detects a first vertical blanking period, the selection circuit selects the second clock signal, the frequency of the first clock signal is changed from the first frequency to the second frequency, and the duration of the vertical blanking period is changed from the first duration to the second duration, and after the second logic circuit detects a second vertical blanking period, the selection circuit selects the first clock signal, and the duration of the vertical blanking period is changed from the second duration to the first duration.

19. The integrated circuit of claim 13, wherein the selection circuit is a multiplexer and the integrated circuit is a graphics processor.

20. The method of claim 11, wherein the third frequency is less than the first frequency.

* * * * *